(12) United States Patent
Zajac, Jr. et al.

(10) Patent No.: US 7,546,915 B1
(45) Date of Patent: Jun. 16, 2009

(54) SQUARE SHAFT LINEAR ACTUATOR

(75) Inventors: Theodore S. Zajac, Jr., Elyria, OH (US); Brian K. Thompson, Lorain, OH (US)

(73) Assignee: Zaytran, Inc., Elyria, OH (US)

( * ) Notice: Subject to any disclaimer, the term of this patent is extended or adjusted under 35 U.S.C. 154(b) by 443 days.

(21) Appl. No.: 11/585,563

(22) Filed: Oct. 24, 2006

(51) Int. Cl.
*B65G 25/00* (2006.01)
*F16C 29/06* (2006.01)

(52) U.S. Cl. .............. 198/750.1; 198/750.2; 198/750.4; 74/89.32; 74/89.33

(58) Field of Classification Search ... 198/750.1–750.4, 198/498, 499, 468.9; 74/89.32, 89.33; 92/93, 92/102; 310/20; 414/749.1
See application file for complete search history.

(56) References Cited

U.S. PATENT DOCUMENTS

| | | | | |
|---|---|---|---|---|
| 5,655,645 | A * | 8/1997 | Foster | 198/750.3 |
| 5,974,948 | A * | 11/1999 | Thompson et al. | 92/165 PR |
| 6,023,111 | A * | 2/2000 | Noda et al. | 310/12 |
| 6,308,821 | B1 * | 10/2001 | Asai et al. | 198/750.7 |
| 6,315,451 | B1 * | 11/2001 | Michioka et al. | 384/42 |
| 6,520,320 | B1 * | 2/2003 | Wang et al. | 198/750.7 |
| 6,561,049 | B2 * | 5/2003 | Akiyama et al. | 74/89.32 |
| 6,662,934 | B1 * | 12/2003 | Iida | 198/750.1 |
| 6,749,057 | B2 * | 6/2004 | Kato | 198/750.7 |
| 6,756,707 | B2 * | 6/2004 | Hochhalter et al. | 310/20 |
| 6,766,897 | B2 * | 7/2004 | Kuwabara | 198/750.1 |
| 6,931,982 | B1 * | 8/2005 | Zajac et al. | 92/5 R |
| 6,935,219 | B2 * | 8/2005 | Kilper et al. | 91/170 R |
| 7,070,041 | B1 * | 7/2006 | Dirschbacher et al. | 198/750.1 |
| 7,128,199 | B2 * | 10/2006 | Yang et al. | 198/468.9 |

OTHER PUBLICATIONS

"Welker Shot Pin Assemblies", ISO 9001: 2000 Certified, Revised Apr. 2004, 20 pgs.

* cited by examiner

*Primary Examiner*—Douglas A Hess
(74) *Attorney, Agent, or Firm*—Eschweiler & Associates, LLC

(57) ABSTRACT

A linear actuator is provided comprising a housing, a rectangular elongate shaft operably coupled to the housing, and a scraper assembly. The shaft has a hardened bearing surface in sliding engagement with a hardened bearing surface of the housing, thus providing a hard-on-hard bearing between the shaft and housing, wherein the shaft is prevented from rotating with respect to the housing. The scraper assembly comprises first and second resilient members positioned within a recess of the housing, wherein one or more scraper blades are disposed between the first and second resilient members. A retaining member coupled to the housing generally compresses the first and second resilient members within the recess, therein biasing a scraping edge of the one or more scraper blades against the shaft bearing surface, wherein the retaining member, one or more scraper blades, and the first resilient member are operable to clear debris from elongate shaft.

20 Claims, 5 Drawing Sheets

SQUARE SHAFT LINEAR ACTUATOR

FIELD OF THE INVENTION

The present invention relates generally to linear actuators, and more particularly to a robust rectangular shaft linear actuator.

BACKGROUND OF THE INVENTION

Industrial linear actuators are commonly used to perform a variety of functions, such as linearly translating a locating pin or operating a clamp for maintaining a position of a workpiece. A typical linear actuator comprises a housing having linearly-translating shaft operably coupled to a drive means, such as a pneumatic piston and cylinder arrangement or a geared electric motor. In many applications, precise positioning of the linearly-translating shaft is essential to maintaining specific tolerances in a final assembly of the workpiece.

It is typically desirable that the shaft not rotate with respect to the housing, but rather, extend in a straight line along a single axis. Thus, it is desirable that the yaw, pitch, and roll of the shaft with respect to the linear translation be minimized. Accordingly, many attempts have been made to accurately position the shaft with respect to the housing, wherein various mechanisms and shaft designs have been used to prevent such yaw, pitch, and roll. One example is illustrated in FIG. 1, wherein a conventional linear actuator 10 is provided having a square shaft 15 that extends and retracts with respect to a housing 20 for positioning a workpiece (not shown). The housing 20, is provided with a square bore 25, wherein a sacrificial square bearing 30 guides the shaft 15 throughout its extension and retraction. The sacrificial square bearing 30 is typically comprised of a material that is substantially softer than the square shaft 15, thus allowing the square bearing to wear more quickly than the typically more-expensive square shaft. Typically, the sacrificial square bearing 30 needs to be replaced on a regular basis, whereas the square shaft 15 may last significantly longer without requiring replacement.

One problem with the sacrificial square bearing 30 tending to wear with time, however, is that the wear on the square bearing typically leads to a potential pitch, yaw, and roll of the square shaft 15 with respect to the housing 20 due to increased slop between the shaft and the square bearing. Thus, inaccuracies in positioning of the shaft 15 with respect to the housing 20 tend to increase as the usage of the linear actuator 10 increases, thus leading to potential production losses due to missed tolerances on the workpiece.

Furthermore, in harsh environments, such as a weld shop or metal cutting environment, contaminants 35, such as weld spatter or metal chips, can affix themselves to the shaft 15 when the shaft is extended from the housing 20. When the shaft 15 is retracted back into the housing 20, the contaminants 35 that are affixed to the shaft can cause further wear and damage to the square bearing 35, thus decreasing the lifespan of the square bearing even further. In order to alleviate some of the additional wear induced by harsh environments, it has been conventional to cover an exposed portion 40 of the shaft 15 with a shroud or boot 45, wherein the shroud or boot generally prevents the contaminants 35 from contacting the exposed portion of the shaft. Such shrouds or boots 45, however, tend to make the linear actuator 10 bulky and cumbersome, and further tend to increase a total length of the linear actuator due to the additional space needed to affix the shroud or boot to the housing 20.

Accordingly, a need exists in the art for a reliable, low-maintenance linear actuator that provides accurate positioning of the shaft over a substantially longer period of use than previously achieved. Such a linear actuator should overcome, or at least minimize, the above-described drawbacks. Preferably, the linear actuator would comprise a simple and economical, yet reliable, device that would accurately position the shaft with a minimum of wear to the linear actuator over its lifetime.

SUMMARY OF THE INVENTION

The present invention overcomes the limitations of the prior art by providing a linear actuator that generally prevents a rotation of its shaft while also extending intervals between maintenance of the linear actuator. Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

The present invention is directed generally toward a linear actuator having a housing, wherein an opening is defined therein, and wherein the opening is generally rectangular in cross section when viewed from an end of the housing. In accordance with one aspect of the invention, a generally elongate shaft is in sliding engagement with the opening of the housing, wherein the elongate shaft is further generally rectangular in cross-section when viewed from the end of the housing. The elongate shaft has an external surface defined thereon, therein further defining a shaft bearing surface, wherein the shaft bearing surface is in sliding engagement with a housing bearing surface associated with the opening in the housing. Accordingly, the shaft is operable to extend and retract through the opening in the housing, wherein a cooperation between the shaft bearing surface and the housing bearing surface generally prevents a rotation of the shaft with respect to the housing.

In accordance with one exemplary aspect of the invention, a recess is further defined within the opening in the housing, wherein a scraper assembly is further associated with the recess. The scraper assembly, for example, is operably coupled to the housing, wherein a first resilient member is positioned in a bottom portion of the recess, and a second resilient member is positioned in a top portion of the recess. One or more scraper blades are further disposed between the first resilient member and the second resilient member, wherein a scraping edge of the one or more scraper blades is in sliding engagement with at least a portion of the external surface of the elongate shaft. A retaining member is further coupled to the housing, wherein the retaining member generally compresses the first and second resilient members within the recess of the housing, therein biasing the scraping edge of the one or more scraper blades against the external surface of the elongate shaft. Accordingly, the retaining member, one or more scraper blades, and the first resilient member are generally operable to scrape and/or wipe debris from the bearing surface of the shaft during its translation with respect to the housing. The one or more scraper blades, for example, may comprise four individual scraper blades that are generally trapezoidal in shape, or two generally V-shaped metal blades, wherein the scraping edges of each scraper blades contact side surfaces of the elongate shaft.

According to another exemplary aspect of the invention, the shaft bearing surface and housing bearing surface generally provide a hard-on-hard bearing interface, wherein wear to both of the shaft bearing surface and housing bearing surface is minimized. In one example, one of the housing bearing surface and shaft bearing surface is harder than the other, while still providing a hard-on-hard bearing interface, wherein a robust and generally wear resistant bearing surface can be maintained.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

DESCRIPTION OF THE INVENTION

Figure 1:
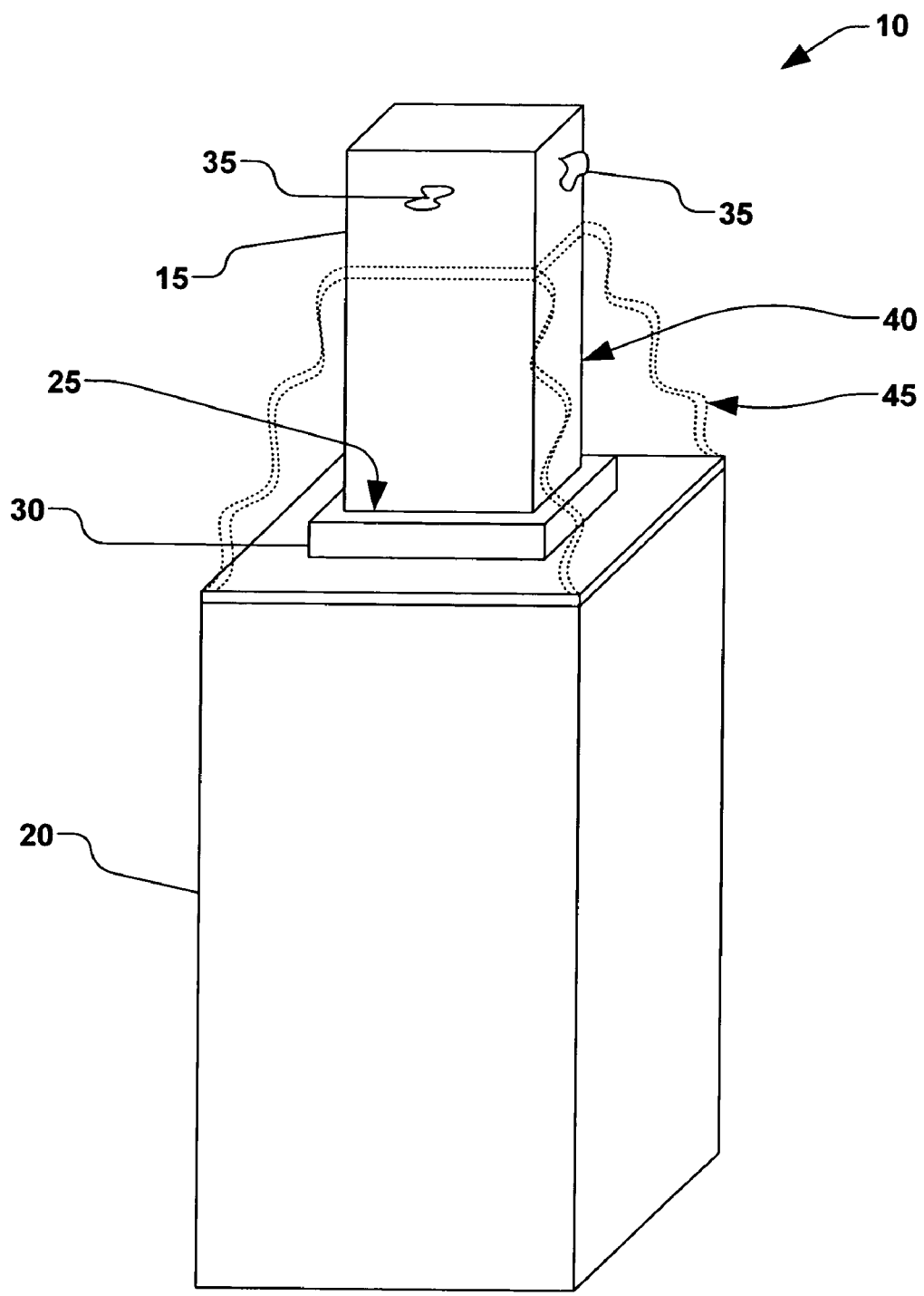
FIG. 1 illustrates an exemplary conventional linear actuator having a square shaft.

The present invention will be described with reference to the drawings wherein like reference numerals are used to refer to like elements throughout. It should be understood that the description of these aspects are merely illustrative and that they should not be taken in a limiting sense. In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram form in order to facilitate description of the present invention.

Figure 2:
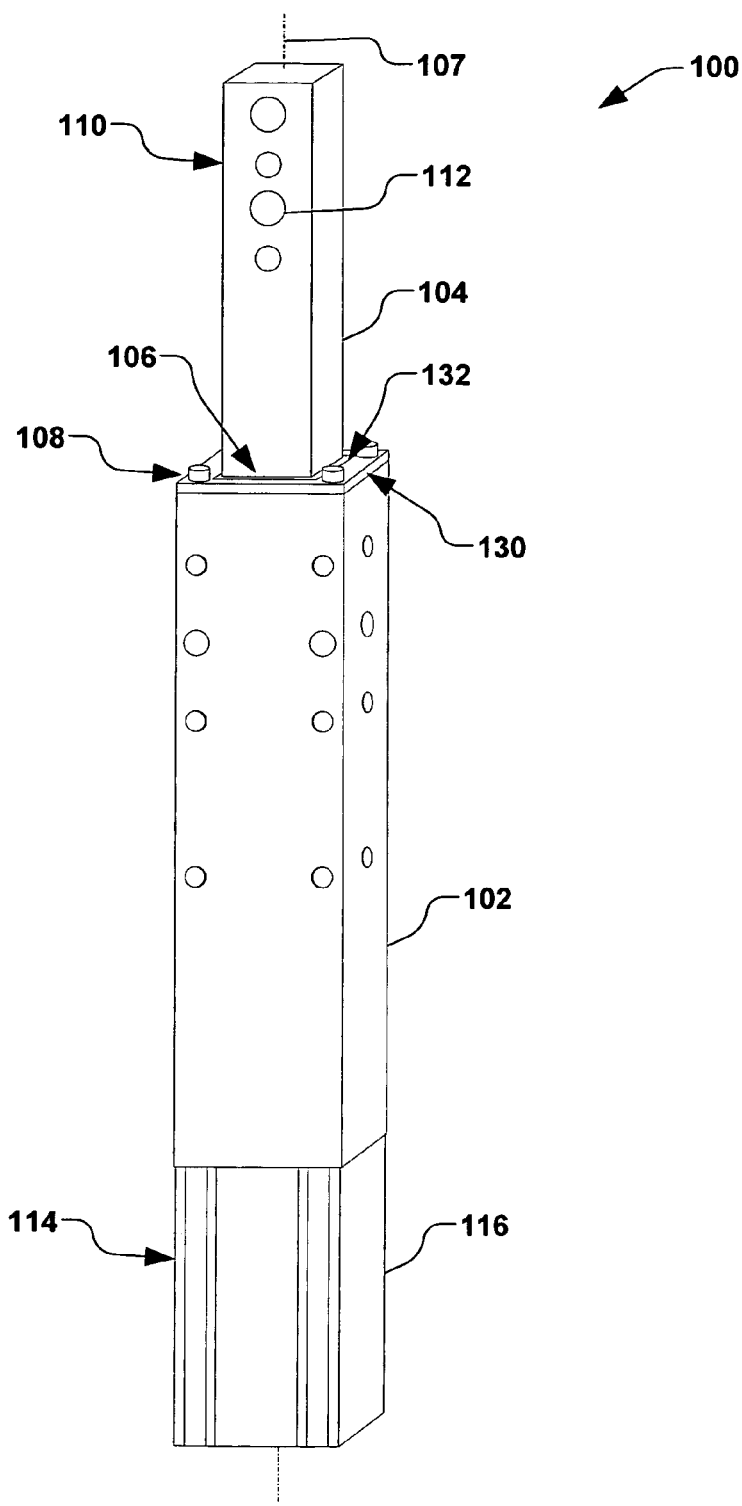
FIG. 2 illustrates an exemplary linear actuator according to one aspect of the present invention.

Referring now to the Figures, FIG. 2 illustrates a perspective view of an exemplary linear actuator 100, in accordance with the present invention. The linear actuator 100 comprises a housing 102 and an elongate shaft 104, wherein the elongate shaft is in sliding engagement with an opening 106 defined in the housing, and wherein the elongate shaft is operable to extend and retract through the opening along a first axis 107. The elongate shaft 104 and opening 106, for example, are generally rectangular in cross section when viewed from a first end 108 of the housing 102. In a preferred embodiment, the elongate shaft 104 and opening 106 are generally square in cross section, however, any rectangular cross-section having equal or unequal sides is contemplated as falling within the scope of the present invention. An end 110 of the elongate shaft 104 may be adapted to connect to one or more end effectors (not shown), such as a clamping arm or positioning pin, as will be understood by one of ordinary skill in the art. For example, the end 110 may comprise one or more holes 112 (e.g., threaded or thru-holes), machines flats (not shown) or other features that generally permit the coupling of the one or more end effectors thereto.

The linear actuator 100, for example, further comprises an actuator 114, such as a motor 116 (e.g., an electric motor, partially illustrated) operably coupled to the elongate shaft 104. For example, the motor 116 is operably coupled to the elongate shaft 104' via one or more gears (not shown), wherein a rotation of the motor, and hence, the one or more gears, is operable to linearly translate the elongate shaft 104 with respect to the housing 102 along the first axis 107. Alternatively, the actuator 114 may comprise a piston and cylinder arrangement (not shown), wherein the piston is operably coupled to the elongate shaft 104, and wherein a fluid pressure applied to the cylinder is operable to translate the elongate shaft with respect to the housing 102. It should be noted that while several examples of actuators 114 are described herein, any actuator operable to linearly translate the elongate shaft 104 with respect to the housing 102 is contemplated as falling within the scope of the present invention.

Figure 3:
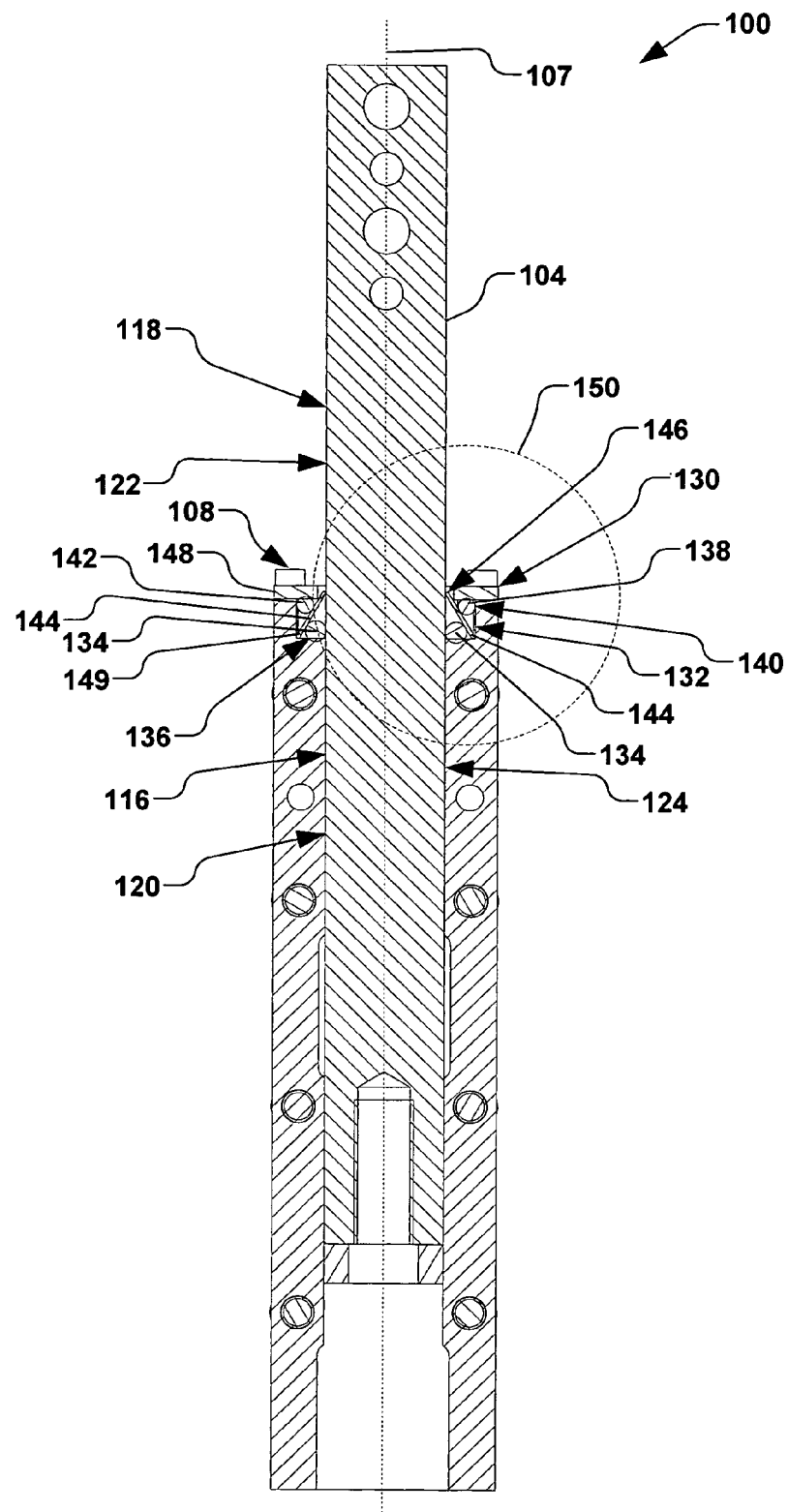
FIG. 3 illustrates a partial cross-section of a linear actuator according to another exemplary aspect of the present invention.

FIG. 3 illustrates a partial cross-sectional view of the exemplary linear actuator 100 of FIG. 2. As illustrated in FIG. 3, the elongate shaft 104 is in sliding engagement with the housing 102 in an engagement region 116 thereof, wherein an external surface 118 of the elongate shaft 104 engages a housing bearing surface 120 associated with the housing. The external surface 118 of the elongate shaft 104, for example, comprises a shaft bearing surface 122, wherein the sliding engagement between the shaft bearing surface and the housing bearing surface 120 generally prevents a rotation of the elongate shaft with respect to the housing 102 about the first axis 107.

In one example, one or more of the housing bearing surface 120 and shaft bearing surface 122 are comprised of a hardened material, wherein minimal wear to the housing bearing surface and/or shaft bearing surface can be achieved. In a preferred embodiment, both the housing bearing surface 120 and shaft bearing surface 122 are comprised of one or more materials having a hardness of approximately HRC 65 or greater, wherein the sliding engagement between the elongate shaft 104 and the housing 102 can be defined as a hard-on-hard bearing surface 124. Such a hard-on-hard bearing surface 124 is advantageous in that minimal wear to both the elongate shaft 104 and housing 102 can be achieved with a small amount of lubrication, wherein longevity of the linear actuator 100 can be greatly increased over conventional linear actuators. In another example, a hardness of one of the housing bearing surface 120 and shaft bearing surface 122 is slightly greater than the other, while both the housing bearing surface and shaft bearing surface still provide the hard-on-hard bearing surface 124. For instance, the housing bearing surface 120 may have a hardness of approximately HRC 67 to HRC 70, while the shaft bearing surface 122 may have a hardness of approximately HRC 65 or greater.

In accordance with another exemplary aspect of the present invention, the linear actuator 100 of FIGS. 2 and 3 comprises a scraper assembly 130, wherein the scraper assembly is operably coupled to the housing 102. For example, the opening 106 comprises a recess 132 defined therein, wherein the recess is further generally rectangular in cross-section when viewed from the first end 108 of the housing 102. As illustrated in FIG. 3, the scraper assembly 130 comprises a first resilient member 134 generally positioned in a bottom portion 136 of the recess 132, and a second resilient member 138 generally positioned in a top portion 140 of the recess. The first and second resilient members 134 and 138, for example, may comprise generally resilient, yet generally wear-resistant o-rings 142 (e.g., o-rings comprised urethane, Viton, Buna-N, butyl, or other generally resilient material).

According to the present invention, the scraper assembly 130 further comprises one or more scraper blades 144 generally disposed between the first resilient member 134 and second resilient member 138 within the recess 132, wherein a scraping edge 146 of the one or more scraper blades is generally in sliding engagement with at least a portion of the external surface 118 of the elongate shaft 104. The scraper assembly 130 further comprises a retaining member 148 generally fixedly coupled to the housing 102, wherein the retaining member generally confines the first resilient member 134, second resilient member 138, and one or more scraper blades 144 within the recess 132 of the housing. In one example, the retaining member 148 generally compresses the first resilient member 134 and second resilient member 138 within the recess 132, wherein the scraping edge 146 of the one or more scraper blades 144 is generally biased against the external surface 118 of the elongate shaft 104, therein being operable to generally scrape debris from the elongate shaft during the extension and retraction thereof. According to one example, each of the one or more scraper blades 144 is comprised of an elongate metal blade 149, wherein each scraper blade is operable to flex when biased against the external surface 118 of the elongate shaft 104.

Figure 4:
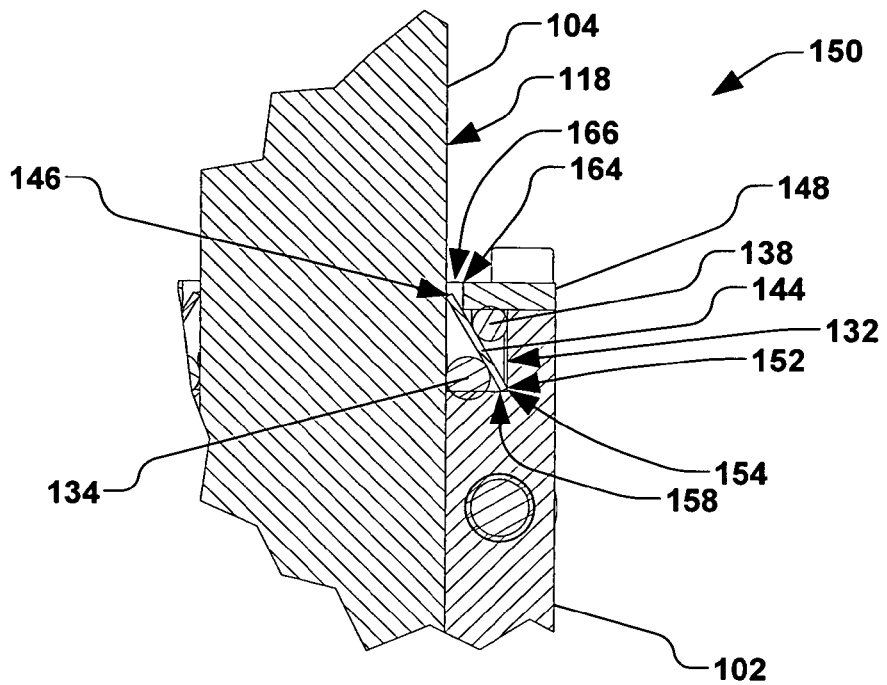
FIG. 4 illustrates a blown-up view of a portion of the linear actuator of FIG. 3.

FIG. 4 illustrates a blown up portion 150 of the linear actuator 100 of FIG. 3, wherein the first resilient member 134, second resilient member 138, scraper blade 144, and retaining member 148 are illustrated for greater clarity. In FIG. 4, for example, the scraper blade 144 is illustrated having the scraping edge 146 generally contacting or nearly contacting the external surface 118 of the elongate shaft 104, while an opposite edge 152 generally contacts a corner 154 of the recess 132. The first and second resilient members 134 and 138, in conjunction with the retaining member 148, thus bias the scraping edge 146 against the external surface 118 of the elongate shaft 104. As one alternative, the retaining member 148 may further bias the one or more scraper blades 144 against the external surface 118 of the elongate shaft 104.

Figure 5:
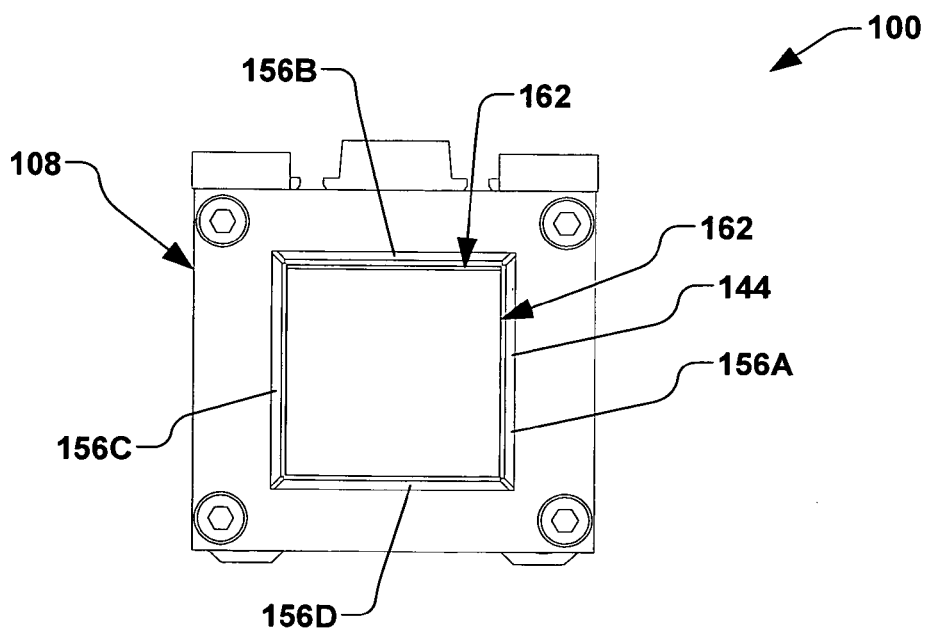
FIG. 5 illustrates a plan view from an end of a linear actuator according to the yet another aspect of the present invention.
Figure 6:
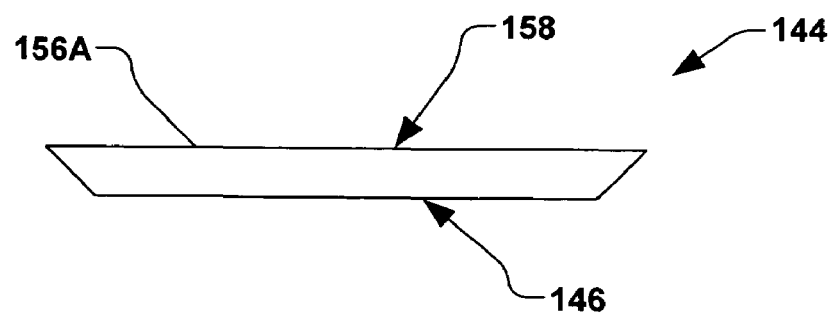
FIG. 6 illustrates an exemplary scraper blade according to another exemplary aspect of the invention.

The one or more scraper blades 144 may be configured in a variety of ways. For example, FIG. 5 illustrated a plan view of the linear actuator 100 as viewed from the first end 108 of FIG. 2. As illustrated in FIG. 5, the one or more scraper blades 144 comprise four individual elongate scraper blades 156A-156D positioned about the opening 106 of the housing 102 and generally within the recess 132. Each of the four elongate scraper blades 156A-156D, for example, are generally trapezoidal in shape, as illustrated in FIG. 6 (scraper blade 156A is shown), wherein the scraping edge 146 of the scraper blade is generally shorter than a respective opposite edge 158 of the scraper blade. The opposite edge 158 generally contacts the corner 154 of the recess 132 of FIG. 4, and the scraping edge 146 generally contacts the elongate shaft 104. It should be noted that the one or more scraper blades 144 of FIGS. 2-7, for example, may be comprised of a phosphor bronze alloy or other material that provides good wear resistance and sufficient rigidity to scrape debris (not shown) from the external surface 118 of the elongate shaft 104.

Figure 7:
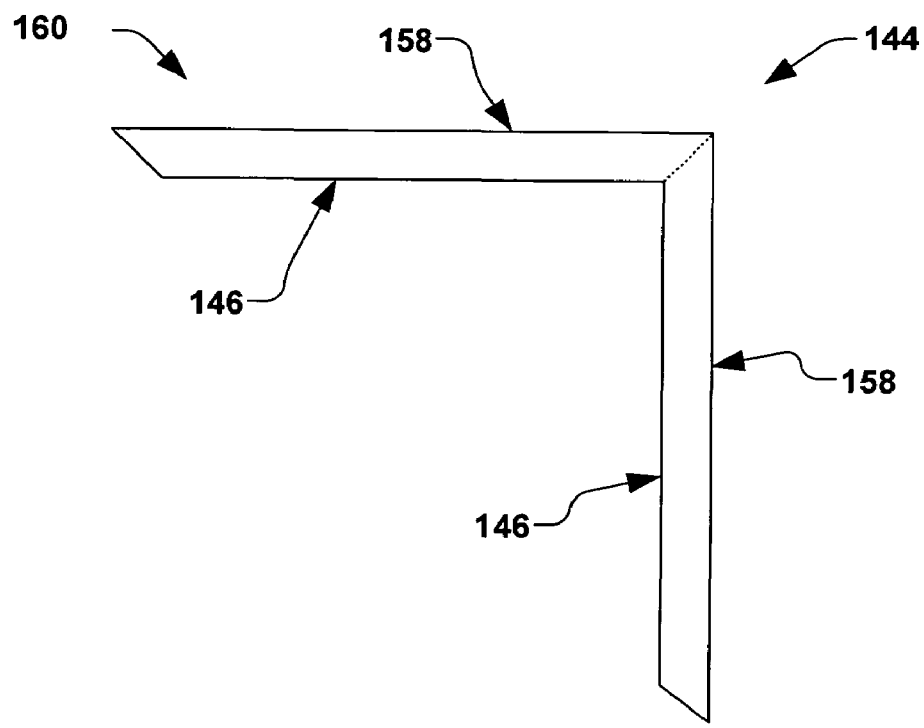
FIG. 7 illustrates another exemplary scraper blade in accordance with still another aspect of the present invention.

In FIG. 7, a generally V-shaped metal blade 160 is illustrated as another example, wherein the one or more scraper blades 144 of FIG. 5 comprise two of the V-shaped metal blades positioned about the opening 106 of the housing 102. Accordingly, the scraping edge 146 of each V-shaped metal blade 160 of FIG. 7 generally contacts or nearly contacts two side surfaces 162 of the elongate shaft 104 of FIG. 5. It should be noted that while several examples of the one or more scraper blades 144 are illustrated, various other configurations are contemplated, such as two generally U-shaped scraper blades (not shown) disposed about the elongate shaft 104, or a single rectangular scraper blade (not shown) surrounding the side surfaces of the shaft.

According to another exemplary aspect of the invention, the retaining member 148 of FIG. 4, for example, is generally rigid and confines the one or more scraper blades 144 within the recess 132, wherein the retaining member further comprises a primary scraping surface 164. The primary scraping surface 164, as illustrated in FIG. 4, for example, is positioned with respect to the elongate shaft 104 such that a gap 166 is present between the primary scraping surface and the external surface 118 of the shaft. Such a gap 166 between the primary scraping surface 164 of the retaining member 148 and the external surface 118 of the elongate shaft 104, for example, generally permits the primary scraping surface to scrape large debris (not shown) from the elongate shaft during the translation of the elongate shaft with respect to the housing 102. Accordingly, the scraping edge 146 of the one or more scraper blades 144 is operable to scrape debris (not shown) that is smaller than the gap 166 from the external surface 118 of the elongate shaft 104. Further, the first resilient member 134, being in general contact with the external surface 118 of the shaft 104, generally defines a secondary scraping surface 168 therebetween, wherein the first resilient member is operable to wipe fine debris (not shown) from the external surface of the shaft during the translation of the shaft with respect to the housing 102. Thus, the retaining member 148, one or more scraper blades 144, and first resilient member 134 provide an efficient and robust scraper assembly 130 operable to protect the housing bearing surface 120 and shaft bearing surface 122.

Although the invention has been shown and described with respect to certain aspects, equivalent alterations and modifications will occur to others skilled in the art upon the reading and understanding of this specification and the annexed drawings. In particular regard to the various functions performed by the above described components (systems, devices, assemblies, etc.), the terms used to describe such components are intended to correspond, unless otherwise indicated, to any component which performs the specified function of the described component (i.e., that is functionally equivalent), even though not structurally equivalent to the disclosed structure that performs the function in the herein illustrated exemplary aspects of the invention. In addition, while a particular feature of the invention may have been disclosed with respect to only one of several aspects, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A linear actuator, comprising:
   a housing having an opening defined therein, the opening being generally rectangular in cross section when viewed from a first end of the housing, wherein the opening further comprises a recess defined therein;
   an elongate shaft in sliding engagement with the opening of the housing, the elongate shaft being generally rectangular in cross-section when viewed from an end thereof and having an external surface defined thereon, wherein the shaft is operable to extend and retract through the opening in the housing; and a scraper assembly operably coupled to the housing, wherein the scraper assembly comprises:
    a first resilient member positioned in a bottom portion of the recess;
    a second resilient member positioned in a top portion of the recess;
    one or more scraper blades disposed between the first resilient member and the second resilient member, wherein a scraping edge of the one or more scraper blades is in sliding engagement with at least a portion of the external surface of the elongate shaft; and
    a retaining member generally fixedly coupled to the housing, wherein the retaining member generally compresses the first and second resilient members within the recess of the housing, therein biasing the scraping edge of the one or more scraper blades against the external surface of the elongate shaft.

2. The linear actuator of claim 1, wherein one or more of the first resilient member and second resilient member comprise resilient o-rings.

3. The linear actuator of claim 1, wherein each of the one or more scraper blades comprises an elongate metal blade.

4. The linear actuator of claim 1, wherein the one or more scraper blades comprise four individual scraper blades that are generally trapezoidal in shape, wherein the scraping edge of each scraper blade is shorter than a respective opposite edge of the scraper blade.

5. The linear actuator of claim 1, wherein the one or more scraper blades comprise two generally V-shaped metal blades, wherein the scraping edge of each scraper blade contacts two side surfaces of the elongate shaft.

6. The linear actuator of claim 1, further comprising an actuator operably coupled to the elongate shaft, wherein the actuator is operable to linearly translate the shaft with respect to the housing.

7. The linear actuator of claim 6, wherein the actuator comprises a motor in geared engagement with the elongate shaft.

8. The linear actuator of claim 6, wherein the actuator comprises a piston disposed within a cylinder, wherein the piston is operably coupled to the shaft.

9. The linear actuator of claim 1, wherein the external surface of the elongate shaft comprises a shaft bearing surface, and wherein the housing further comprises a housing bearing surface, wherein the shaft bearing surface slidingly engages the housing bearing surface, therein generally preventing a rotation of the shaft with respect to the housing.

10. The linear actuator of claim 9, wherein the shaft bearing surface and the housing bearing surface are comprised of one or more materials having a hardness of greater than approximately HRC 65.

11. The linear actuator of claim 9, wherein the housing bearing surface has a hardness of approximately HRC 67 to HRC 70, and the shaft bearing surface has a hardness of approximately HRC 65 or greater.

12. The linear actuator of claim 1, wherein the retaining member is substantially rigid and comprises a primary scraping surface, wherein the primary scraping surface is positioned such that a gap exists between the external surface of the elongate shaft and the primary scraping surface, wherein the primary scraping surface is operable to scrape large debris from the elongate shaft during a translation of the elongate shaft with respect to the housing.

13. The linear actuator of claim 1, wherein the first resilient member generally contacts the external surface of the elongate shaft, therein defining a secondary scraping surface, wherein the first resilient member is operable to wipe fine debris from the elongate shaft during a translation of the elongate shaft with respect to the housing.

14. The linear actuator of claim 1, wherein the one or more scraper blades are comprised of phosphor bronze.

15. The linear actuator of claim 1, wherein the elongate shaft is generally square in cross section when viewed from the end thereof.

16. A linear actuator, comprising:
    a housing having an opening defined therein and a housing bearing surface further defined within the opening, the opening being generally rectangular in cross section when viewed from a first end of the housing, wherein the opening further comprises a recess defined therein;
    an elongate shaft being generally rectangular in cross-section when viewed from an end thereof, the elongate shaft having a shaft bearing surface in sliding engagement with the housing bearing surface, wherein the shaft is operable to extend and retract through the opening in the housing, and wherein the shaft is generally prevented from rotating with respect to the housing; and
    a scraper assembly operably coupled to the housing, wherein the scraper assembly comprises:
        a first resilient member positioned in a bottom portion of the recess;
        a second resilient member positioned in a top portion of the recess;
        one or more scraper blades disposed between the first resilient member and the second resilient member, wherein a scraping edge of the one or more scraper blades is in sliding engagement with at least a portion of the shaft bearing surface; and
        a retaining member generally fixedly coupled to the housing, wherein the retaining member generally compresses the first and second resilient members within the recess of the housing, therein biasing the scraping edge of the one or more scraper blades against the shaft bearing.

17. The linear actuator of claim 16, wherein the shaft bearing surface and the housing bearing surface are comprised of one or more materials having a hardness of greater than approximately HRC 65.

18. The linear actuator of claim 17, wherein the housing bearing surface has a hardness that is greater than a hardness of the shaft bearing surface.

19. The linear actuator of claim 16, wherein each of the one or more scraper blades comprises an elongate metal blade.

20. The linear actuator of claim 16, comprising four scraper blades that are generally trapezoidal in shape, wherein the scraping edge of each scraper blade is shorter than a respective opposite edge of the scraper blade.

* * * * *